Jan. 1, 1963 L. G. ZILLER 3,071,088
MOUNTING DEVICE FOR AUXILIARY APPARATUS
ON AGRICULTURAL IMPLEMENTS
Filed Oct. 17, 1960 2 Sheets-Sheet 1

INVENTOR
LESTER G. ZILLER
BY
Lowell & Henderson
ATTORNEYS

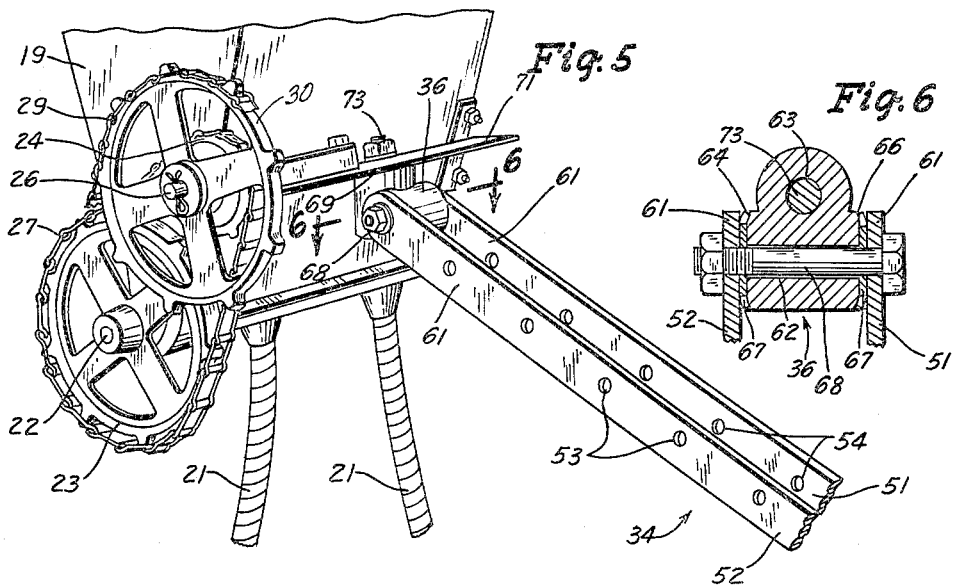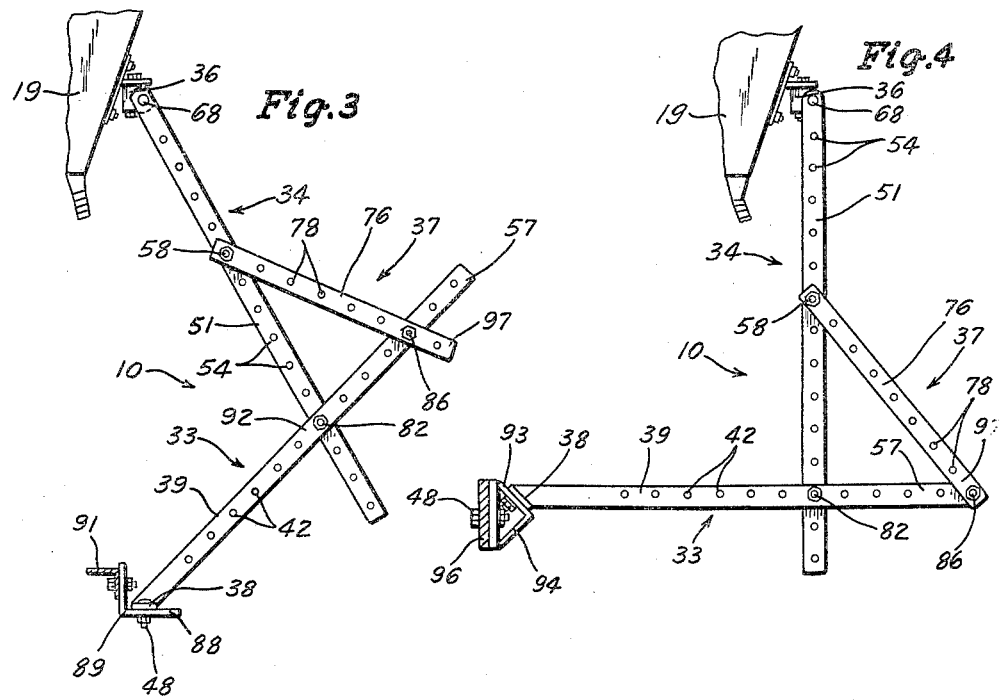

United States Patent Office 3,071,088
Patented Jan. 1, 1963

3,071,088
MOUNTING DEVICE FOR AUXILIARY APPARATUS ON AGRICULTURAL IMPLEMENTS

Lester G. Ziller, Kansas City, Mo., assignor to Comfort Equipment Company, Kansas City, Mo., a corporation of Missouri
Filed Oct. 17, 1960, Ser. No. 62,913
2 Claims. (Cl. 111—73)

This invention relates to agricultural implements such as row crop planters, listers and the like, and particularly to a device for detachably mounting an applicator for a granular material on an implement in a position where the applicator can receive driving power from a rotary means on the implement.

It is an object of this invention to provide a novel and useful mounting device adapted to be quickly and readily attached to any present-day row crop planting implement or the like for properly positioning an applicator for granular insecticides, and fertilizers and the like so as to receive driving power from the implement.

Another object of this invention is the provision of a granular applicator mounting device universally adapted for mounting on row crop planting implements, wherein the device is adjusable to be mounted on various frame portions of the implement to support the applicator in a horizontal position for use.

A further object of this invention is the provision of a mounting device for the purpose described hereinbefore which has relatively movable arms adapted to be releasably locked in different related angular and extended positions whereby the granular applicator supported by the device can be vertically and transversely adjusted relative to the implement.

Another object of this invention is the provision of a granular applicator mounting device having adjustable portions which can easily be positioned in different angularly related arrangements for avoiding portions of the planter in order to support the applicator at a desired location.

Yet another object of this invention is the provision of a universal mounting device for a granular applicator for the purpose set forth hereinbefore which is economical to manufacture, easy to install, and effective in service.

These objects, and other features and advantages of this invention will become readily apparent from the following description when taken in conjunction with the accompanying drawings, wherein:

FIGS. 3 and 4 are fragmentary side elevational views, showing the relative arrangement of parts of the mounting device when used on two different planter frame structure;

FIG. 5 is an enlarged, fragmentary perspective view of the front of a granular applicator, shown in assembly relation with the upper end of the mounting device; and FIG. 6 is a cross sectional view taken along the line 6—6 in FIG. 5.

Figures 1, 2:
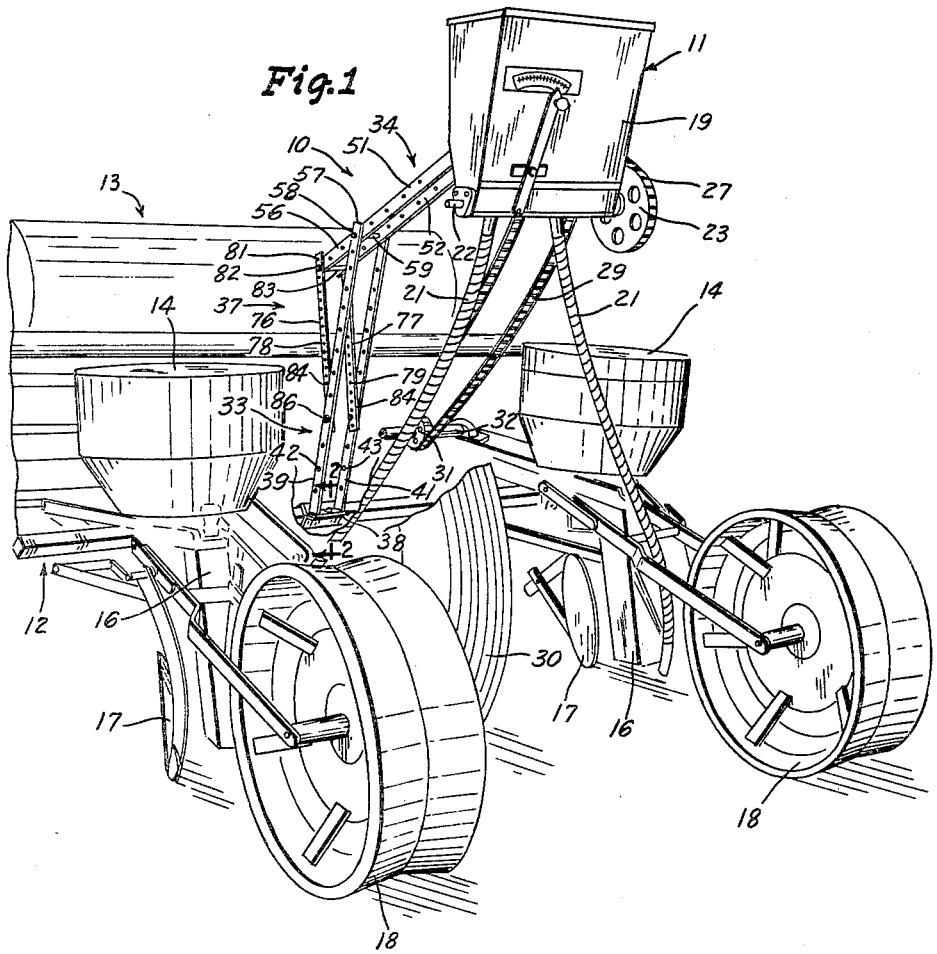
FIG. 1 is a fragmentary perspective view looking from the left rear of a row crop planter, showing a preferred embodiment of the present invention mounted on the planter for supporting a granular applicator, certain parts being broken away for purposes of clarity.
FIG. 2 is an enlarged cross sectional view taken along the line 2—2 in FIG. 1 and showing a particular planter frame structure.

Referring now to the drawings, a mounting bracket or device is indicated generally at 10 in FIG. 1 and is shown supporting a granular applicator 11 on the frame 12 of a planter 13 of a commercially available type. The planter 13 includes a pair of hoppers 14, each of which contains seed to be discharged through a shoe 16 behind a planting mechanism 17 and in front of a compaction wheel 18.

The granular applicator 11 is also of a commercially available type and includes a hopper 19 for dispensing granular or powdered materials such as insecticide, fertilizers and the like through a pair of feeding tubes 21 to locations adjacent to the seeds which are planted by the mechanisms 17. Additionally, the hopper 19 includes an agitator shaft 22 (FIG. 5) having mounted on one end thereof a sprocket wheel 23 that is coupled to a cooperating sprocket wheel 24 mounted on a jack shaft 26, the sprocket wheels being driven by means of an endless link chain 27. Driving power is supplied to the granular applicator sprocket wheel 24 by means of another endless link chain 29 trained about the wheel 30 and extended for connection with a sprocket wheel 31 mounted on a shaft 32 which may be driven from one of the planter wheels 30.

The mounting device 10 comprises a base unit 33 (FIG. 1) adapted to be secured at one end to the frame 12, an extension unit 34 pivotally connected adjacent one end to the base unit 33 and including a pivot casting 36 (FIG. 5) at the other end on which the hopper 19 is mounted, and including further a brace unit 37 (FIG. 3). The brace unit 37 is arranged for connection between the base unit 33 and the extension unit 34 to maintain these units in any one of a number of different angularly related and extended positions.

The base unit 33 comprises an integral U-shaped member having a flat base 38 and a pair of elongated arms 39 and 41 extended in a laterally spaced, parallel manner. A plurality of transversely aligned, longitudinally spaced holes 42 and 43 are formed in the arms 39 and 41 for a purpose hereinafter described. Referring particularly to FIG. 2, the base unit 33 is shown mounted on one type of planter frame structure, namely a tool bar 49. A two-piece clamping unit 47 is shown secured to the tool bar 49 by a pair of nuts and bolts 48, the flat lower surface 44 of the base 38 being shown secured to the flat upper surface 46 of a portion of the unit 47. A lock washer 51 may be inserted between the base 38 and the element 47 if desired, it being noted that by loosening the nuts and bolts 48 inserted through the base 38, the base unit 33 can be pivoted thereabout through a distance limited by the abutting engagement of the base 38 with the unit 47.

The extension unit 34 comprises a pair of elongated flat bars 51 and 52, similar to the arms 39 and 41, and also having a plurality of longitudinally spaced, transversely aligned holes 53 and 54 (FIG. 5) formed therein. In the position of FIG. 1, the lower ends 56 of the bars 51 and 52 are shown placed between and is a side-by-side relationship with the upper ends 57 of the arms 39 and 41, such that pairs of respective holes 42, 43 and 53, 54 are transversely aligned. In this position, a connecting bolt 58 is inserted through the aligned pairs of holes in the arms and the bars, and also through a spacer 59 inserted between the bars 51 and 52, so as to pivotally engage the base unit 33 to the extension unit 34.

The pivot casting 36 (FIGS. 5 and 6) mounted at the upper ends 61 of the bars 51 and 52, acts as a universal joint or connection and has a normally horizontally disposed bore 62 formed therein, and has also a normally vertically disposed bore 63 formed therein which is offset from the bore 62. The ends 64 and 66 of the casting 36 are serrated for complementary locking engagement each with a lock washer 67 inserted between the respective end of the casting and an upper end 57 of a bar. Thus, to clamp the pivot casting 36 between the bars 51 and 52, a nut and bolt device 68 is inserted through the horizontal bore 62, the lock washers 67 and the bar ends 61, and then tightened.

In this position of the pivot casting 36 (FIG. 5), the hopper is securely mounted in a level position on the casting 36 upon the placement of the upper flat surface 69 of the casting against the bottom side of a bracket flange 71 which is extended across the front of the hopper 19. A nut and bolt device 73 is then inserted through the vertical bore 63 in the casting 36 and tightened. It can readily be seen that upon loosening the nut and bolt device 73, the hopper 19 can be pivoted about the casting 36 so that the hopper 19 can be locked in any one of a number of different horizontally rotatable positions relative to the extension unit 34.

When the base unit 33 and the extension unit 34 have been adjusted to provide for the chain 29 being drivingly connected between the hopper sprocket wheel 24 and the planter sprocket wheel 31, the brace unit 37 is affixed to the units 33 and 34 to hold these units in their angularly related positions. The brace unit 37 comprises a pair of elongated braces 76 and 77 which have longitudinally spaced, transversely aligned holes 78 and 79 formed therein. In the position of the mounting device 10 in FIG. 1, the upper ends 81 of the braces 76 and 77 are placed in a side-by-side relationship with the lower ends 56 of the bars 51 and 52 so as to align respective holes therein, and permit the insertion of a connecting bolt 82 through the holes, and also through a spacer 83 placed between the bars 51 and 52. The lower ends 84 of the braces 76 and 77 are also placed in a side-by-side relation with the arms 39 and 41 of the base unit 33 so as to align respectively holes formed therein, so that each brace end is connected to a corresponding arm by a nut and bolt device 86.

The adaptability of the mounting device 10 for being mounted on different types of planter frame structures, and its adjustability for supporting the applicator hopper 19 is shown by comparing the different positions of the device 10 in FIGS. 3 and 4 to each other and to the position illustrated in FIG. 1. The FIG. 1 position shows the base plate 38 of the base unit 33 mounted on a tool bar type of frame member 49 by means of a bracket unit 47 therefor, and wherein the base unit arms 39 and 41 extend upwardly and rearwardly from the frame member 49. The extension unit bars 51 and 52 are connected to the arms 39 and 41 so as to extend further upwardly and rearwardly of the frame member 49, and at an obtuse angle relative to the base unit arms 39 and 41. In this position, the applicator hopper 19 is rigidly held so that the sprocket wheel 24 is positioned relative to the planter sprocket wheel 31 to accommodate a driving connection therebetween by means of the chain 29.

In the FIG. 3 position, the base 38 of the base unit 33 is shown secured on the lower horizontally disposed leg 88 of a right angle bracket 89 in turn secured to a right angle frame member 91 of the planter. The base unit arms 39 and 41 again extend upwardly and rearwardly of the frame member 91, however, the extension unit bars 51 and 52 are now pivotally connected to the arms 39 and 41 at a mid-point location 92, rather than at the upper ends 57 thereof as in FIG. 1. Thus, the relative extensible positions of the base unit 33 and the extension unit 34 are adjustable. Additionally, the bars 51 and 52 are inclined upwardly but rearwardly from the arms 39 and 41, and rigidly locked thereto and in that position by the brace unit 37 so as to position the applicator hopper 19 substantially directly above the frame member 91.

In the FIG. 4 position, another different mounting arrangement is shown for the mounting device 10, wherein the base 38 is mounted on the upper inclined leg 93 of a triangular bracket 94 secured in turn to the side of another type of frame member 96. In this position, the base unit arms 39 and 41 extend horizontally outwardly and rearwardly of the frame member 96. The extension bars 51 and 52 are shown as having been moved upwardly from their FIG. 3 posititon and toward the upper or outer ends 57 of the arms 39 and 41 and then extended vertically at right angles to the arms 39 and 41. To accommodate this right angular position of the units 33 and 34, one pair of ends 97 of the braces 76 and 77 are swung outwardly from their FIG. 3 position to be re-connected, by the bolts 86, to the outermost set of transversely aligned holes in the arms 39 and 41.

In summation, the mounting device of this invention is capable first of being mounted on any present-day planter or the like, and secondly of being angularly and extensibly adjustably positioned so as to support an auxiliary attachment such as a granular applicator in an operative position on the planter. The mounting device is sufficiently adjustable to clear various portions of the planter which might tend to obstruct the supporting of the applicator at a position for operation from the planter, and at an elevation to provide for a gravity distribution of the material contained therein to the proper location adjacent the seeds being planted.

Although a preferred embodiment of this invention has been disclosed herein, it is to be remembered that various modifications and alterations can be made within the scope of the invention as defined by the appended claims.

I claim:

1. In combination with any one of a plurality of commerically available wheeled planters having different frames and different rotatable power means for operating planting devices connected to the frames, an auxiliary attachment apparatus for feeding granular material to the ground adjacent the planting devices comprising, hopper means for holding the granular material and including a rotary member adapted to be driven by said rotatable power means, bracket means for adjustably mounting said hopper means on a portion of the frame of any one of the planters comprising integral first arm means, one end of which is pivotally lockably engageable with the frame of said one planter, integral second arm means, means pivotally and lockably connecting said second arm means to said first arm means at any one of a number of locations spaced longitudinally of either of said arm means, a lockable universal connecting means mounted at one end of said second arm means for attachment to said hopper means, whereby said first and second arm means are angularly adjustable relative to each other to place said rotary member in position to be operatively driven by said rotatable power means, and third arm means interconnected between said first and second arm means to lock said arm means in relatively adjusted positions thereof.

2. In combination with any one of a plurality of commerically available wheeled planters having different frames and different rotatable power means for operating planting devices connected to the frames, an auxiliary attachment apparatus for feeding granular material to the ground adjacent the planting devices comprising, hopper means for holding the granular material and including a rotary member adapted to be driven by said rotatable power means, bracket means for adjustably mounting said hopper means on the frame of any one of the planters comprising, first arm means having a plurality of longitudinally spaced openings formed therein, a mounting plate integral with said arms means at one end thereof and having a flat surface adapted for complementary engagement with a flat surface portion on the frame of a planter, means insertable through said plate and said surface portion to pivotally and lockably connect said first arm means to said planter frame, second arm means having a plurality of longitudinally spaced openings formed therein, a lockable universal connection mounted at one end of said second arm means for attachment to said hopper means, said first and second arm means placeable in different side-by-side positions with one of said openings aligned wherein said two arm means are angularly related, a lockable pivot means inserted through said aligned openings, third arm means having a plurality of openings spaced longitudinally therein, said third arm means placeable in a side-by-side position with said first and second arm means wherein a pair of said bar openings are aligned respectively with an opening in each of said first and second arm means, and connecting means inserted through said aligned openings, whereby said hopper means is movable to and locked in a position wherein said rotary member is in driving relationship with said rotatable power means.

References Cited in the file of this patent
UNITED STATES PATENTS

| | | |
|---|---|---|
| 2,415,934 | Buehler | Feb. 18, 1947 |
| 2,936,726 | Gandrud | May 17, 1960 |